S. E. SVENDSEN.
SPOTLIGHT.
APPLICATION FILED MAY 31, 1921.
1,433,044.
Patented Oct. 24, 1922.
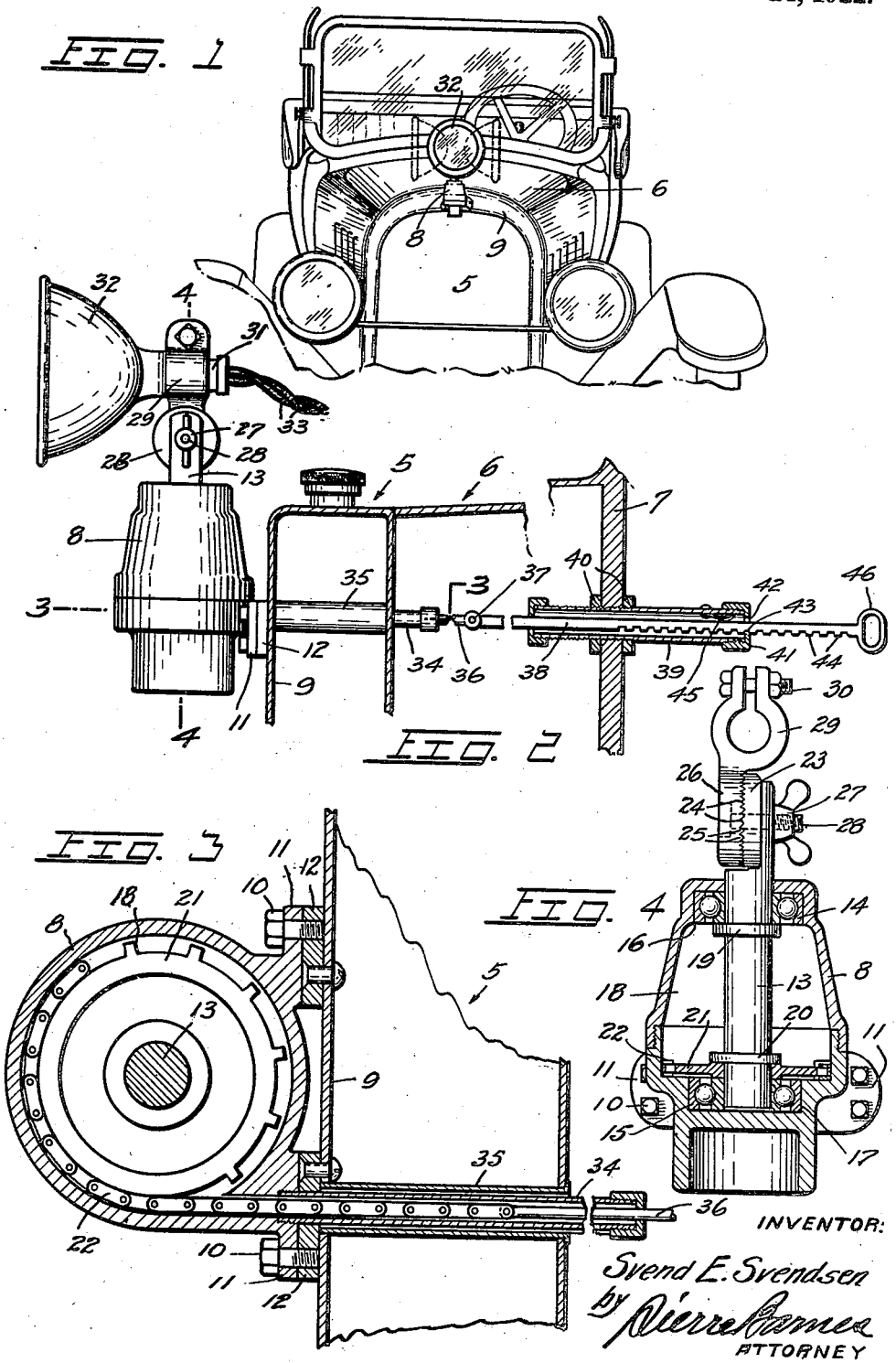
INVENTOR:
Svend E. Svendsen
by Pierre Barnes
ATTORNEY Patented Oct. 24, 1922.

1,433,044

UNITED STATES PATENT OFFICE.

SVEND E. SVENDSEN, OF SEATTLE, WASHINGTON.

SPOTLIGHT.

Application filed May 31, 1921. Serial No. 473,756.

*To all whom it may concern:*

Be it known that I, SVEND E. SVENDSEN, a citizen of the United States, residing at Seattle, in the county of King and State of Washington, have invented certain new and useful Improvements in Spotlights, of which the following is a specification.

This invention relates to spot-lights for motor vehicles; and its object is to provide a lamp of this character which may be used independently of or supplementary to the head lights of a car to facilitate the steering of the same.

Another object is to provide a spot-light which is disposed adjacent to the front end of a car so that the beam of light therefrom will not interfere with the driver's sight.

Another object is to provide improved means for adjustably securing the spot-light to direct the light beam to illuminate the road or the environs thereof at a selected distance in front of a car.

Another object is the provision of novel means whereby the driver from his seat may control a spot-light at the front end of a car to cause the light beam to be directed at an object or to traverse the road in front of the car.

Other objects and advantages of the invention will appear in the following specification.

The invention is illustrated in the accompanying drawings, in which,—

Figure 1 is a front elevation of an automobile to which apparatus embodying the present invention is applied. Fig. 2 is a view partly in side elevation and partly in longitudinal section of the apparatus and portions of the car structure. Figs. 3 and 4 are sectional views taken substantially through 3—3 and 4—4 of Fig. 2.

In said drawings, the reference numeral 5 designates the radiator; 6, the hood and 7, the instrument board of an automobile.

According to the present invention, a casing 8 of a general circular shape is rigidly secured to the upper portion of the radiator frame 9 and in front of the same as by bolts 10 extending through the casing lugs 11 and engaging in plates 12 which are riveted or otherwise secured to the frame 9.

Rotatably mounted in said casing is a vertically disposed spindle or shaft 13. As shown in Fig. 4 said spindle is fitted in bores of the housings 14 and 15 of suitable ball-bearing devices, said housings being respectively lodged in recesses 16 and 17 provided in the upper and lower walls of the casing chamber 18 and at opposite sides of the spindle collars 19 and 20. Rigid with the spindle 13 and preferably between the collar 20 and the housing 15 of the lower series of ball-bearings is a sprocket wheel 21. The diameter of the chamber 18 at said sprocket wheel is sufficiently larger than the wheel's diameter to accommodate a sprocket chain 22 and afford a guideway for the latter.

Formed integral with or rigidly secured to the upper end of the spindle 13 is a disk element 23 which is arranged to have its axis at right angles to the spindle axis. One face of the disk 23 is formed with a plurality of radially disposed teeth 24 (Fig. 4) which are engageable between the teeth 25 of an axially aligned companion disk 26 which is coupled in selected rotary positions to the disk 23 by means of a thumb nut 27, or an equivalent, engaging a bolt 28 extending through both disks.

The disk 26 constitutes a support for an eye element 29 within which is secured, as by a clamping bolt 30, the stem 31 of a spot light lamp 32. The axis of the eye element 29 is disposed at right angles to and in offset relations with respect to the pivotal connection between the aforesaid disks 23 and 26 so that by suitably rotating the disk 26 the axis of the spot light may be brought into any angular relations with respect to a horizontal plane.

The electric circuit leads 33 are connected with a battery, not shown, provided in the automobile.

The chain 22, above mentioned, extends in a substantially tangential direction from the casing chamber 18 into a tube 34 which extends through the radiator 5 into the space under the hood 6.

The tube 34 is desirably secured to the casing 8 and within the radiator it is surrounded by a pipe 35 the ends of which are respectively secured by water tight joints to the front and back walls of the radiator. Within the tube 34, an end of the chain 22 is connected to an end of a rod 36 whose other end is connected at 37 (Fig. 2) with a rack bar 38 which extends through a pipe 39 which, in turn, extends through the instrument board 7 and is secured to the latter as by nuts 40 threaded on the pipe. To the rear end of the pipe 39 is secured a cap 41 which is provided with a slot 42 to accommodate the rack bar 38, the cap structure immediately below said slot affords a catch, as at 43, which is engageable in a selected one of the notches between the rack bar teeth 44. A spring 45 serves to yieldingly retain said rack bar in engaged relations with the catch 43 when the handle end 46 of the rack bar is released by the operator.

The lamp 32 is adjusted vertically about the axis of the disks 23 and 26 by regulating the disk 26 and thereupon securing the same by means of the nut 27. To adjust or control the horizontal movements of the lamp, the operator disengages the rack bar 38 and by moving the same forward or backward imparts motion through the rod 36 to the chain 22 whereby the wheel 21 is actuated to turn the spindle in a desired rotary direction to correspondingly move the lamp.

When the spot-light is properly adjusted in both horizontal and vertical directions with respect to the automobile a beam of light from the spot-light will, for example, illuminate a strip of road or the curb line at one side thereof when the vehicle is travelling at a predetermined distance from the side of the road. When travelling upon roads which are unfamiliar to the driver or which are curved or "broken," the spot-light may be rotatably moved to afford a beam of light to illuminate an object removed from the light path for which the lamp is normally set or the spot-light may be turned to and fro horizontally to afford a moving beam which traverses the roadway to enable the driver to sweep with his eyes the entire width of the road.

The operation and advantages of the invention will, it is believed, be understood from the foregoing description.

I do not wish to be understood as confining myself to the specific construction hereinbefore described and illustrated in the drawings, as changes may be made therefrom without sacrificing the spirit of the invention and within the scope of the following claims.

What I claim, is,—

1. In the combination with a motor vehicle, a casing vertically supported upon the vehicle radiator, a vertical shaft journaled within said casing and having one end projecting therefrom, a spot-light operatively connected to the projecting end of said shaft, a sprocket wheel secured upon said shaft and within said casing, the circumference of said sprocket wheel being of a slightly lesser degree than the circumference of the internal wall of the said casing, means for rotating said shaft and spot-light comprising a section of link chain wherein a portion of the same is adapted to engage upon the sprocket wheel within the casing and wherein the thickness of said chain is substantially equal to the said difference in circumference between the internal wall of said casing and the sprocket wheel for positively engaging said chain with said wheel when the same is forced into or drawn out of the casing, and means for effecting movement of said chain section.

2. In combination with a motor vehicle having a radiator and an instrument board, a tube extending horizontally through said instrument board, a horizontal tube extending through said radiator, a circular casing mounted on said radiator and offset from said tube, said casing having an opening therethrough and alined with the radiator tube, a perpendicular shaft journaled in said casing and having one end projecting therefrom, a spot-light carried by the projecting end of said shaft, a sprocket wheel mounted upon said shaft and within said casing, the circumference of said sprocket wheel being of a slightly lesser degree than the circumference of the internal wall of the said casing, and means for rotating said shaft, said means comprising a series of bars extending through the instrument board and into the radiator tube, a section of link chain connected at one end to the said bars within the radiator tube, wherein a portion of the said chain is adapted to engage upon the sprocket wheel within the casing, wherein the thickness of said chain is substantially equal to the said difference in circumference between the internal walls of said casing and sprocket wheel for positively engaging said chain with said wheel when the chain is forced into or drawn out of the casing.

Signed at Seattle, Washington, this 23rd day of May, 1921.

SVEND E. SVENDSEN.

Witnesses:
PIERRE BARNES,
MARGARET G. SUPPLE.